(12) United States Patent
Focke et al.

(10) Patent No.: US 6,290,448 B1
(45) Date of Patent: Sep. 18, 2001

(54) LIFTING DEVICE (PALLET DEVICE) WITH PIVOTAL ARM

(75) Inventors: Heinz Focke, Verden; Pavel Livotov, Hannover, both of (DE)

(73) Assignee: Focke & Co. (GmbH & Co.), Verden (DE)

( * ) Notice: Subject to any disclaimer, the term of this patent is extended or adjusted under 35 U.S.C. 154(b) by 0 days.

(21) Appl. No.: 09/283,304

(22) Filed: Apr. 1, 1999

(30) Foreign Application Priority Data

Apr. 7, 1998 (DE) .............................................. 198 15 434

(51) Int. Cl.$^7$ ................................................... B65G 25/04
(52) U.S. Cl. ............................... 414/222.01; 414/226.05; 414/744.3; 414/799; 198/308; 198/374
(58) Field of Search ........................ 414/222.01, 226.05, 414/226.04, 744.5, 744.3, 744.8, 799; 198/374, 308

(56) References Cited

U.S. PATENT DOCUMENTS

| | | | |
|---|---|---|---|
| 2,838,898 | * | 6/1958 | Owen .................................... 198/308 |
| 4,941,374 | * | 7/1990 | Focke ......................................... 83/13 |
| 5,085,556 | | 2/1992 | Ohtomi . |
| 5,297,924 | | 3/1994 | Neri et al. . |
| 5,333,370 | * | 8/1994 | Suzuki .................................... 29/563 |
| 5,338,150 | * | 8/1994 | Focke et al. ........................... 414/799 |
| 5,348,440 | * | 9/1994 | Focke ................................. 414/792.9 |
| 5,539,981 | * | 7/1996 | Burcham et al. ................ 29/888.061 |
| 5,716,189 | * | 2/1998 | Winski et al. ........................ 414/786 |
| 5,769,184 | * | 6/1998 | Hofmeister ........................... 187/267 |

FOREIGN PATENT DOCUMENTS

| | | |
|---|---|---|
| 28 02 738 | 7/1979 | (DE) . |
| 27 00 695 | 8/1984 | (DE) . |
| 85 12 963 | 1/1987 | (DE) . |
| 36 13 089 | 10/1987 | (DE) . |
| 87 13 515 | 12/1987 | (DE) . |
| 40 18 684 | 11/1994 | (DE) . |
| 196 26 826 | 1/1998 | (DE) . |
| 819 627 | 6/1997 | (EP) . |
| 56145973 | * 3/1983 | (JP) . |

OTHER PUBLICATIONS

Schwenkarmroboter sind au der Spitze, In: Elektronik, 22/Nov. 2, 1984, pp. 24 and 26.
Patent Abstracts of Japan, vol. 7, No. 133 (M–221), Jun. 10, 1983 & JP 58 047725 A (Nomura Sangyo KK), Mar. 19, 1983.

* cited by examiner

Primary Examiner—Joseph A. Fischetti
(74) Attorney, Agent, or Firm—Sughrue, Mion, Zinn, Macpeak & Seas, PLLC (57) ABSTRACT

Lifting device, in particular a pallet device (10), comprising a pivotal arm (19) at the free end of which in the area of a controllable rotary mount (42) is mounted a separate support element for a lifting head (43), i.e. a pivotal support arm (46) at the free end of which the lifting head (43) is rotary mounted, and the rotary movements of the lifting head (43) are carried out by an operating cylinder (49), preferably with two end positions.

6 Claims, 6 Drawing Sheets

LIFTING DEVICE (PALLET DEVICE) WITH PIVOTAL ARM

BACKGROUND OF THE INVENTION

The invention relates to a lifting device, in particular a pallet device, comprising a pivotal arm of at least two pivotally interconnected arm sections and with a lifting head, in particular a suction head, at the free end of the pivotal arm.

Pallet devices having a pivotal arm, in particular a horizontal tilt arm, on an upright support column, are often used for loading or unloading bulk packages, in particular cartons, onto/from pallets. The horizontal pivotal arm or tilt arm is conventionally equipped with three controllable rotary axes and furthermore vertically movable on the support column. At the end of the pivotal arm is arranged a tool for accommodation of loads, in particular a lifting head, suction head, grabber or the like.

Pallet devices have to perform many varied conveying tasks. In practice, the task lies in particular in delivering arriving objects, in particular cartons of different size, shape or different content, according to a specific distribution programme to a plurality of pallets and to set them down thereat in layers and in a precise position. This is the main object of the invention.

SUMMARY OF THE INVENTION

The object lies in further development of a pallet device of the aforedescribed type in order to improve the application of the pallet device by relatively simple operations, in particular possible relative positions of the receiving tool or lifting head when receiving and/or setting down an object.

The object is achieved in that the receiving tool or the lifting head is mounted on a separate support arm which is itself pivotally mounted to the end of the pivotal arm.

According to the invention, a/an (additional) support arm is mounted on a controllable rotary axis at the free end of the pivotal arm, at the free end of which is arranged the lifting head which is itself rotary around a (vertical) axis.

This makes possible a highly variable movement programme of the pallet device with automatic or programmed control. In particular, different objects, for example cartons, can be set down on pallets in layers in a specified formation, i.e. also with simultaneous operation of a plurality of, for example, three pallets on separate parallel palette tracks.

The support arm, which is connected to the rotary axis of the pivotal arm, is movable into any angular position relative to the pivotal arm. According to the invention, the lifting head is pivotal by a simple operating element, in particular by a (pneumatic) cylinder, around a central upright axis, i.e. in two alternative positions which are offset by 90° relative to each other, i.e. in the longitudinal direction and in the transverse direction to the support arm. This ensures simple and effective movability of the lifting head.

BRIEF DESCRIPTION OF THE DRAWINGS

Further details and peculiarities of the inventive lifting device will now be described in more detail, based on an exemplary embodiment which is illustrated in the drawings. Shown are, in FIG. 1: a pallet device station with pallet device, in a diagrammatical side view.

DESCRIPTION OF A PREFERRED EMBODIMENT

Design and operational method of a lifting conveyer or pallet device 10 are described in the drawings based on a pallet station in which pallets 11 are loaded according to a specified program in the area of several, i.e. three, pallet positions 12, 13, 14. Each pallet position 12, 13, 14 is associated with a conveyer 15, 16, 17 which conveys loaded pallets 11 from a respective pallet position 12, 13, 14. The conveyers 15, 16, 17 are designed are roller tracks. Accordingly, three conveyers 15, 16, 17 are provided in the form of three parallel spaced roller tracks.

Common pallet device 10 is composed of an upright support column 18 on which a jib or pivotal arm 19 is mounted at the side facing towards pallet positions 12, 13, 14. A forklike rotary mount 20 for pivotal arm 19 is mounted on an upright side surface of support column 18. Rotary mount 20, and thus pivotal arm 19, is movable up and down on stationary support column 18.

Support column 18 is at the bottom supported on a support structure, in the current example on a table 21. The latter is composed of a support plate 22 and (four) supports 23 at the comers of the table top.

Conveyers 15, 16, 17 respectively end in the area of pallet device 10, i.e. at the side of rotary mount 20 for pivotal arm 19. Pallet location 12, 13, 14 is respectively formed by an ascendable and descendable platform 24, 25, 26 at the end of an associated conveyer 15, 16, 17. Platform 24, 25, 26 is a respective ascendable and descendable extension or an end section of a conveyer 15, 16, 17.

Figure 1:
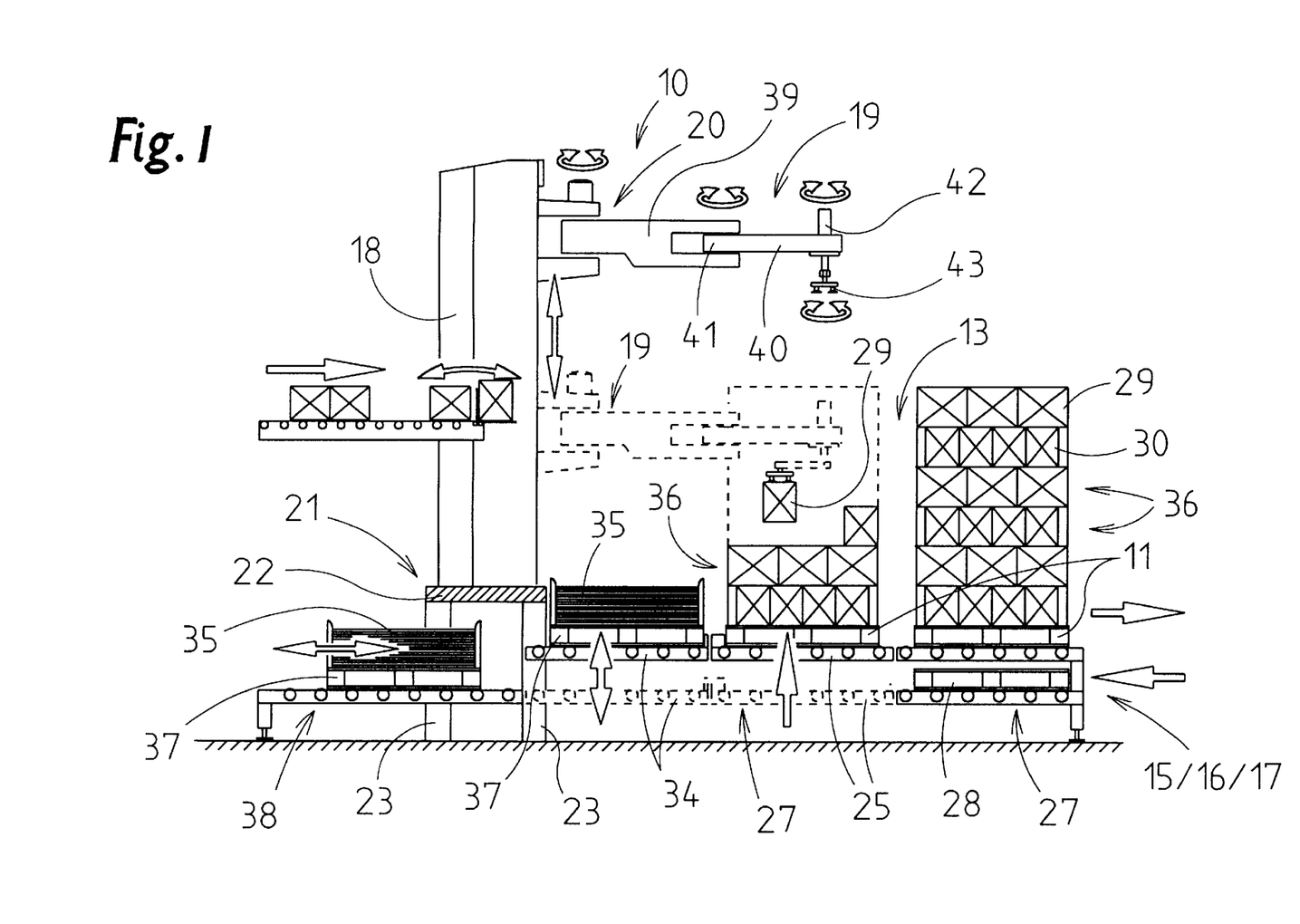
Figure 2:
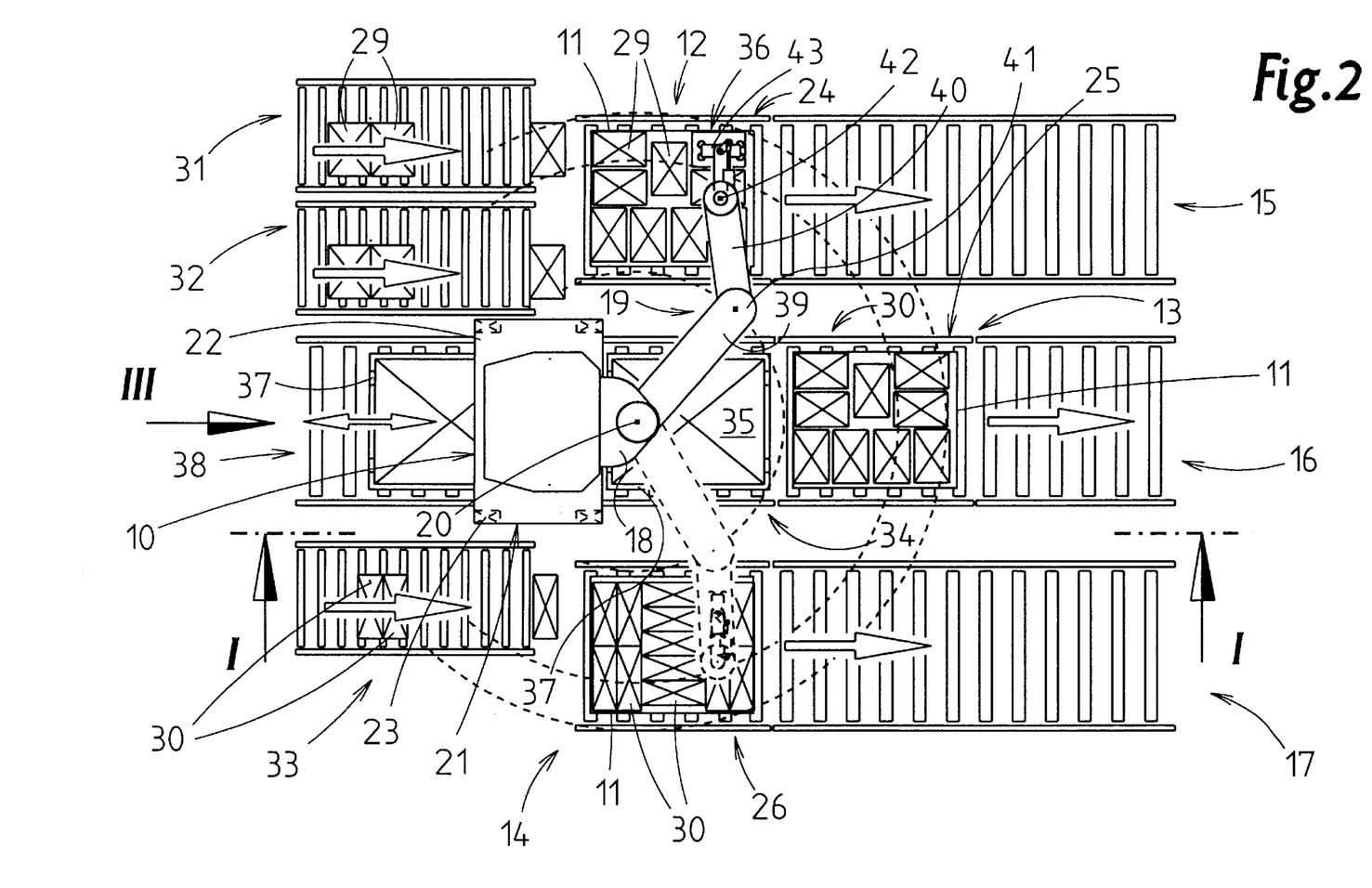
FIG. 2: the pallet device station of FIG. 1, in a ground plan.
Figure 3:
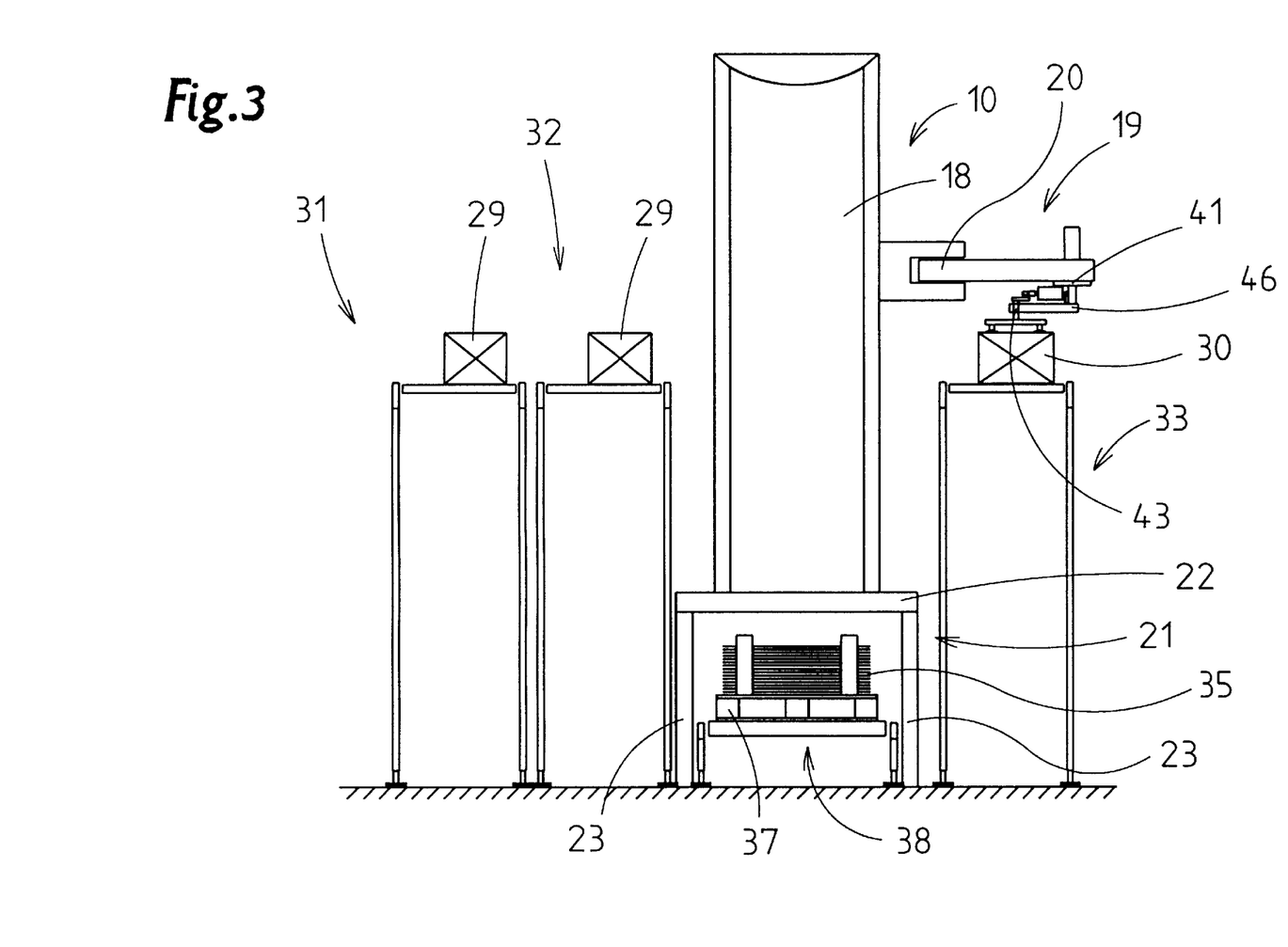
FIG. 3: a view of the pallet device station according to arrow III in FIG. 2.

Below conveyers 15, 16, 17, which are positioned at a raised level, is arranged a respective return conveyer 27 which is also designed as a roller conveyer and serves to return empty pallets, i.e. empty pallets 28, to a respective pallet location 12, 13, 14. Platform 24, 25, 26 is lowered to the level of return conveyer 27 for the purpose of accommodating an empty pallet 28. Empty pallet 28 is conveyed onto platform 24, 25, 26 and lifted with the latter to the level of a respective conveyer 15, 16, 17 (FIG. 1). In the raised position, platform 24, 25, 26 with pallet 11 establishes pallet location 12, 13, 14.

Each pallet 11 is to be loaded with objects in the area of pallet location 12, 13, 14, in the present case with (dispatch) cartons 29, 30. The latter are kept available in the operational area of the pallet device 10 to be received and set down on one of pallets 11.

In the illustrated exemplary embodiment, cartons 29, 30 are delivered on carton tracks 31, 32, 33. These are also designed to be roller tracks. A plurality of carton tracks 31, 32, 33, i.e. three, is provided which extend parallel to each other. At the end of a carton track 31, 32, 33 at least one respective carton 29, 30 is kept at the ready for transfer by pallet device 10 on a platform (not illustrated), on a table or directly on carton track 31, 32, 33.

Carton tracks 31, 32, 33 are positioned in different relative positions relative to pallet device 10. Two carton tracks 31, 32 are arranged directly adjacent each other and terminate adjacent pallet position 12 at the side of pallet device 10. The third carton track 33 is arranged on the opposite side of pallet device 10 and terminates in the area of pallet position 14. On carton tracks 31, 32, 33, cartons 29, 30 are delivered in close formation or with different gaps, in any case in an irregular manner. Cartons 29, 30 can then also be of different size or different shape (square, rectangular).

Conveyers 15, 16, 17 are arranged in symmetrical relative position to pallet device 10. Middle conveyer 16 is oriented centrally to pallet device 10 whilst the other two conveyers 15, 17 terminate with a gap on both sides of pallet device 10. Due to this relative position, pallet location 13, which is associated with conveyer 16, is offset in the conveying direction and arranged at a distance from pallet device 10. Ascendable and descendable platform 25 for this pallet location 13 is also offset in the conveying direction relative to platforms 24 and 26.

This establishes in the area directly alongside pallet device 10 or table 21 space for an auxiliary platform 34 for keeping intermediate layers 35 at the ready. These are thin shapes, for example of carton material, which are positioned between objects or cartons 29, 30 placed in layers 36 on pallets 11. A stock of intermediate layers 35 is kept at the ready on auxiliary platform 34, i.e. on a layer pallet 37 which is delivered by an auxiliary track 38 which is an extension of middle conveyer 16, but in the plane of return conveyer 27. Auxiliary track 38 is passed through below table 21 or below table top 22. A layer pallet 37 with a stock of intermediate layers 35 can be supplied at the side of table 21 opposite auxiliary platform 34. Layers 36 are respectively picked up by pallet device 10 from layer pallet 37 and positioned on a completed layer 36 of pallet 11.

Pallet device 10 is designed in a special way. Pivotal arm 19 is a tilt arm which is pivotal in a horizontal plane, comprising two arm sections 39, 40. Arm sections 39, 40 of virtually equal length are in the area of a middle hinge 41 pivotally or tiltably interconnected. A controllable rotary mount 42 is arranged at the free end of outer arm section 40. All mounts of pivotal arm 19, i.e. rotary mount 20, hinge 41 and rotary mount 42, are controllable relative to rotary movements, for example by an electronic axis control. For this purpose, respective servo-motors are arranged in the area of the rotary mounts or hinges.

At the free end of arm section 40 is mounted a downwardly oriented lifting head 43 as a receiving tool for the objects, i.e. for cartons 29, 30. This is a suction head. It is composed of a plate-shape support element 44 with suckers 45 at the bottom. Suckers 45 grab a carton 29, 30 at its top. Thus, carton 29, 30 can be lifted off carton track 31, 32, 33 and be delivered to a pallet 11 in the area of pallet location 12, 13, 14.

The pallet device can set down cartons 29, 30 in accordance with a programmed packing plan with different orientation on pallets 11. In the present case, cartons 29, 30 are in the longitudinal extent oriented either in the conveying direction or transversely thereto. Edges of cartons 29, 30 are respectively oriented parallel to the edges of pallets 11.

Suction head 43 is not positioned directly at the end of pivotal arm 19 in the area of rotary mount 42 but on a movable, i.e. pivotal, intermediate support, in the present example designed as an elongated support arm 46, mounted with one end on rotary mount 42, i.e. connected thereto by a shaft pin 47.

At the end of support arm 46 opposite shaft pin 47, lifting head 43 or its support element 44 is itself mounted so as to be rotary around a vertical axis, i.e. via a shaft section 48. The latter is centrally connected to rectangular support element 44. Lifting head 43 can be rotated via shaft section 48 relative to support arm 46 around a central vertical axis.

In the present exemplary embodiment, the rotary movements of lifting head 43 are not freely controllable, but only two alternative positions are possible. In the one position, lifting head 43 or support element 44 extends in the direction of support arm 46 (continuous lines in FIG. 7). The alternative position is oriented transversely thereto (shaded in FIG. 7).

This operation of lifting head 43 via shaft section 48 is performed by means of an operating element which is mounted on support arm 46 itself. At its top is an operating cylinder 49, in particular a pneumatic cylinder, which is with one end pivotally mounted in a fixed mounting 50. A piston rod 51 is pivotably joined to an eccenter, i.e. a pivotal lever 52 which is at the other side firmly connected to an end of shaft section 48 which passes through support arm 46.

Figure 7:
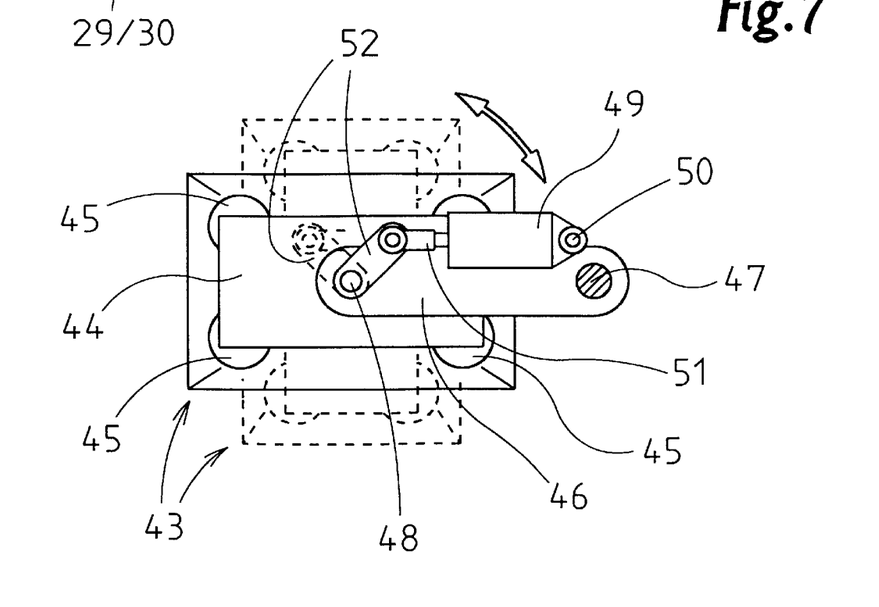
FIG. 7: a detail as in FIG. 6, in a top view or horizontal cross-section along the line VII—VII in FIG. 6.

Operating cylinder 49 is controllable in such a manner that pivotal lever 52 is movable in two alternative positions (continuous and shaded in FIG. 7). This establishes respective longitudinal and transverse positions for lifting head 43.

Figure 4:
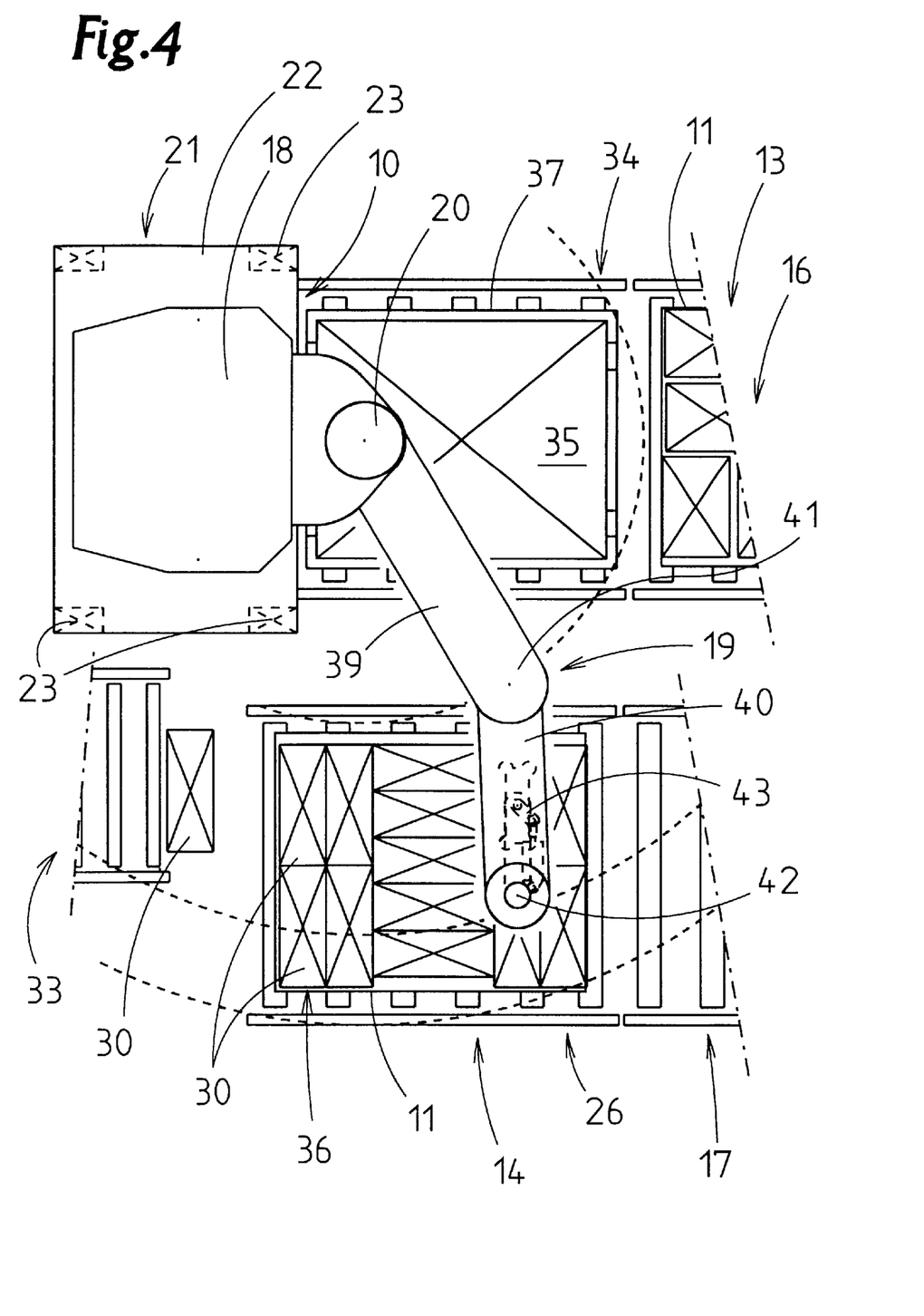
FIG. 4: the pallet device in an operational position in a top view, at an enlarged scale.
Figure 5:
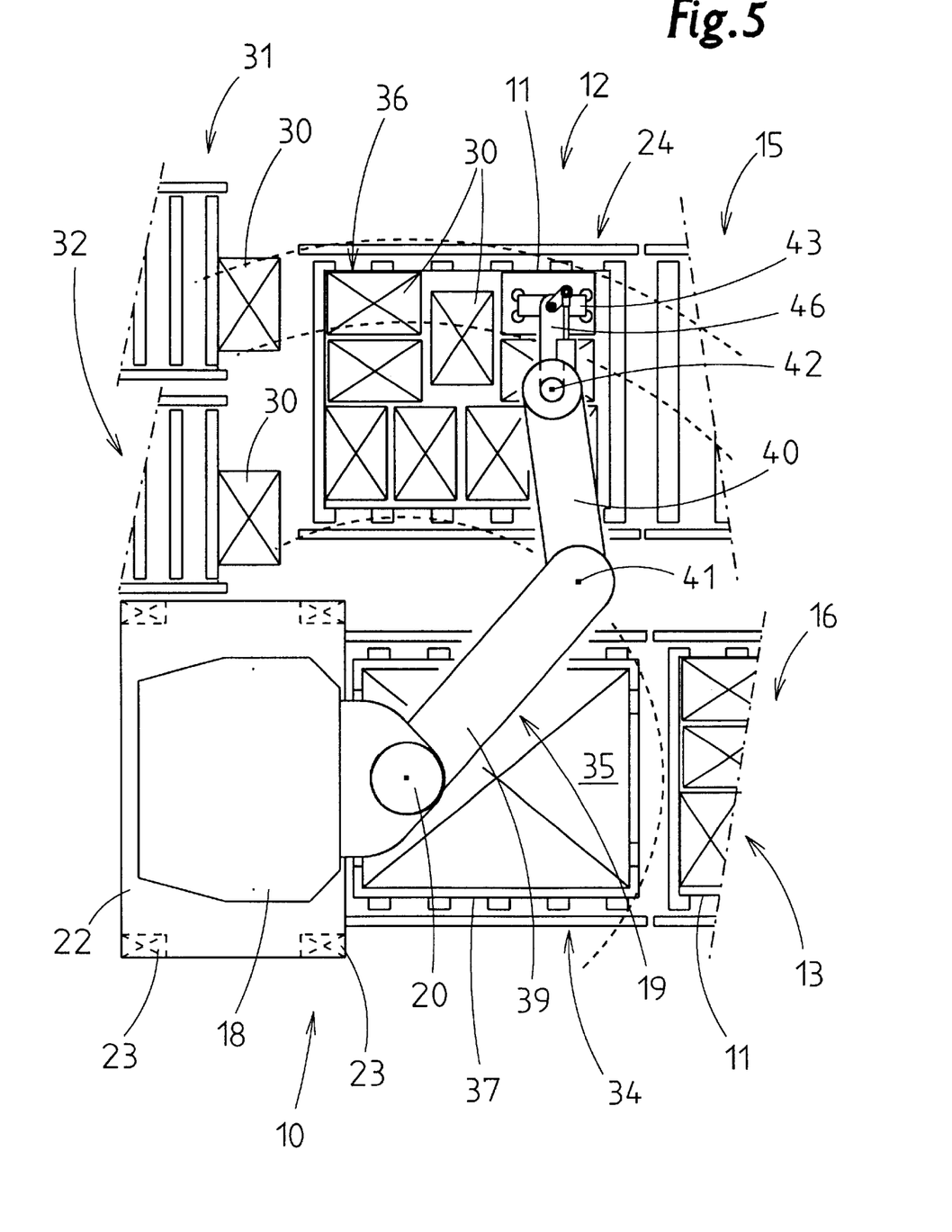
FIG. 5: an illustration analog with FIG. 4 in a different position of the pivotal arm.
Figure 6:
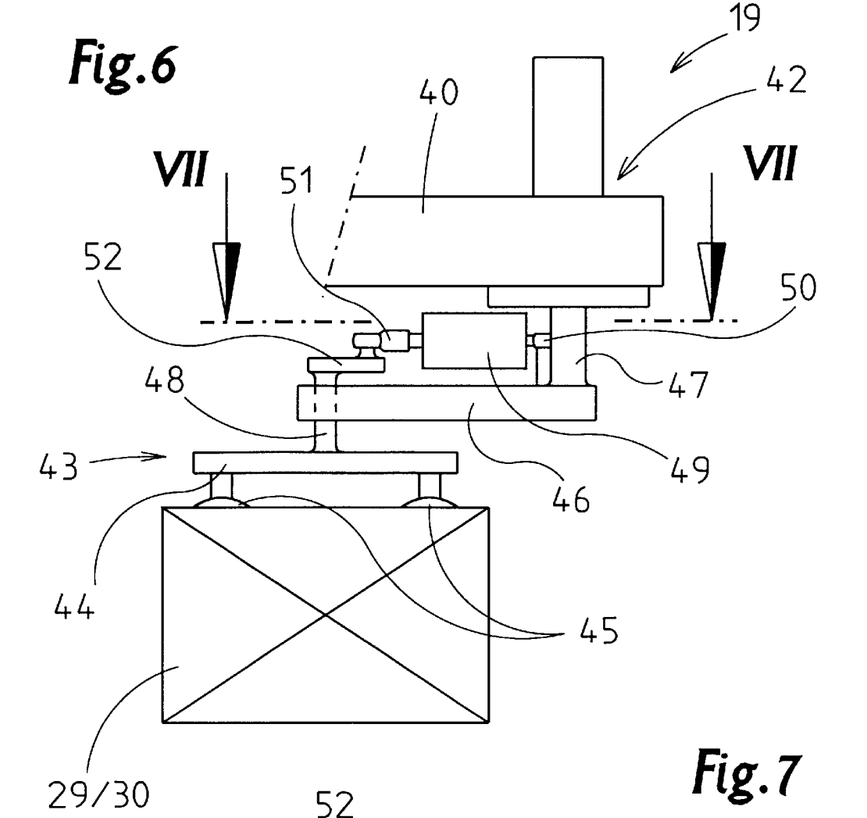
FIG. 6: an end area of the pivotal arm with lifting head, in a side view.

This design of pallet device 10 or pivotal arm 19 makes it possible to achieve the different formations of cartons 29, 30 within layers 36 for all pallets 11 in pallet positions 12, 13, 14. The effective exposition of pivotal arm 19 can be reduced or increased by support arm 46 in dependence on the relative position. FIG. 4 illustrates a position of lifting head 43 with reduced effective length of pivotal arm 19. This makes it possible to set down without problems cartons 29, 30 on pallet 11 in an area facing towards pallet device 10. In a position as in FIG. 5, support 46 is in an extension or continuation of arm section 40. This allows further removed areas of a pallet to be reached, i.e. with a desired relative position of carton 29, 30 by corresponding position of lifting head 43.

List of Reference Marks

10 Pallet Device
11 Pallet
12 Pallet Location
13 Pallet Location
14 Pallet Location
15 Conveyer
16 Conveyer
17 Conveyer
18 Support Column
19 Pivotal Arm
20 Rotary Mount
21 Table
22 Support Plate
23 Support
24 Platform
25 Platform
26 Platform
27 Return Conveyer
28 Empty Pallet
29 Carton
30 Carton
31 Carton Track
32 Carton Track
33 Carton Track
34 Auxiliary Platform 35 Intermediate Layer
36 Layer
37 Layer Pallet
38 Auxiliary Track
39 Arm Section
40 Arm Section
41 Hinge
42 Rotary Mount
43 Lifting Head
44 Support Element
45 Sucker
46 Support Arm
47 Shaft Pin
48 Shaft Section
49 Operating Cylinder
50 Fixed Mounting
51 Pistonrod
52 Pivotal Lever

What is claimed is:

1. An apparatus supported on a surface for handling cartons (29, 30) which are delivered on parallel carton tracks (31, 32, 33) to a pallet station and set down on pallets (11) by means of a pallet device (10), wherein:
   a) the cartons (29, 30) are delivered on three of said parallel carton tracks (31, 32, 33), and said pallet device has a base elevated above said surface;
   b) the cartons (29, 30) are set down on the pallets (11) by the pallet device (10) according to a programmable packing arrangement in a region of three pallet locations (12, 13, 14);
   c) each of the three pallet locations (12, 13, 14) is associated with one of three loading conveyers (15, 16, 17) for loaded pallets (11);
   d) the loading conveyers (15, 16, 17) are positioned symmetrically to the pallet device (10) in such a manner that a middle one (16) of said three conveyers is positioned centrally to the pallet device (10), and each of the other two of said three conveyers (15, 17) is positioned on either side of the middle conveyor with equal spacing to the middle conveyer (16); and
   e) wherein layer pallets (37), with a stock of intermediate layers (35), are delivered to the pallet device (10) on an auxiliary track (38) located below the pallet device base, so that one of said layer pallets (37) at a time is moved, on the auxiliary track (38) below the pallet device (10), to an auxiliary platform (34) which is arranged in line with the middle conveyer (16), and in a vertically different plane, for loaded pallets (11) in front of the pallet device (10).

2. An apparatus for handling cartons (29, 30) which are delivered on parallel carton tracks (31, 32, 33) to a pallet station and set down on pallets (11) by means of a pallet device (10), wherein:
   a) the cartons (29, 30) are delivered on three of said parallel carton tracks (31, 32, 33), and said pallet device has a base elevated above said surface;
   b) the cartons (29, 30) are set down on the pallets (11) by the pallet device (10) according to a programmable packing arrangement in a region of three pallet locations (12, 13, 14);
   c) each of the three pallet locations (12, 13, 14) is associated with three loading conveyers (15, 16, 17) for loaded pallets (11);
   d) the loading conveyers (15, 16, 17) are positioned symmetrically to the pallet device (10) in such a manner that a middle one (16) of said three conveyers is positioned centrally to the pallet device (10), and each of the other two of said three conveyers (15, 17) is positioned on either side of the middle conveyor with equal spacing to the middle conveyer (16);
   e) empty pallets (28) are delivered to the pallet station by return conveyers (27);
   f) each of the return conveyers (27) for empty pallets (28) is assigned to a corresponding one of the loading conveyers (15, 16, 17) for full pallets (11); and
   g) each of said return conveyers (27) is disposed under the respectively assigned one of said loading conveyers (15, 16, 17).

3. The apparatus according to claim 2, wherein:
   a) each loading conveyer (15, 16, 17) for full pallets (11) has a pallet location (12, 13, 14) adjacent to the pallet device (10) for loading a pallet (11); and
   b) arranged at each pallet location (12, 13, 14) is a lift-and-drop platform (24, 25, 26) for receiving one full pallet (11) or empty pallet (28) at time,
   c) said apparatus comprising means for dropping the platform (24, 25, 36) to the level of a return conveyer (27) to receive an empty pallet (28), and for lifting the platform with the empty pallet (28) to the level of the corresponding assigned loading conveyer (15, 16, 17).

4. An apparatus supported on a surface for handling cartons (29, 30), which are delivered on parallel carton tracks (31, 32, 33) to a pallet station and set down on pallets (11) by a pallet device (10), wherein:
   a) the cartons (29, 30) are delivered to the pallet station on three of said parallel carton tracks (31, 32, 33) in such a way that individual cartons (29, 30) are gripped by the pallet device (10),
   b) the cartons (29, 30) are set down on pallets (11) by the pallet device (10) according to a programmable packing arrangement,
   c) three pallets (11) are respectively positioned in three pallet locations (12, 13, 14),
   d) the pallet device (10) has a pivotable arm (19) which is movable in a horizontal plane and which has a free end carrying a lifting head (43) configured as a suction head for gripping one carton (29, 30) at a time,
   e) the pallet locations (12, 13, 14) are positioned in a region of movement of the lifting head (43) in such a way that each pallet (11) is loaded with the cartons (29, 30) in a region of a pallet location,
   f) each of the three pallet locations (12, 13, 14) is associated with one of three loading conveyers (15, 16, 17) for loaded pallets (11), with each loading conveyer (15, 16, 17) immediately following the associated pallet location (12, 13, 14), respectively,
   g) the three loading conveyers (15, 16, 17) are positioned symmetrically to the pallet device (10) in such a manner that a middle one (16) of said three loading conveyers is positioned on both sides with equal spacing to the middle conveyer (16), and
   h) wherein said pallet device has a base elevated above said surface, and layer pallets (37) with a stock of intermediate layers (35) are delivered to the pallet device (10) on an auxiliary track (38), so that one of said layer pallets (37) at a time is moved on the auxiliary track (38) to an auxiliary platform (34), said auxiliary track being located below the pallet device and arranged in line with the middle conveyor (16), and in a vertically different plane, for loaded pallets (11) in front of the pallet device (10).

5. An apparatus supported on a surface for handling cartons (29, 30), which are delivered on parallel carton tracks (31, 32, 33) to a pallet station and set down on pallets (11) by a pallet device (10), wherein:
  a) the cartons (29, 30) are delivered to the pallet station on three of said parallel carton tracks (31, 32, 33) in such a way that individual cartons (29, 30) are gripped by the pallet device (10),
  b) the cartons (29, 30) are set down on pallets (11) by the pallet device (10) according to a programmable packing arrangement,
  c) three pallets (11) are respectively positioned in three pallet locations (12, 13, 14),
  d) the pallet device (10) has a pivotable arm (19) which is movable in a horizontal plane and which has a free end carrying a lifting head (43) configured as a suction head for gripping one carton (29, 30) at a time,
  e) the pallet locations (12, 13, 14) are positioned in a region of movement of the lifting head (43) in such a way that each pallet (11) is loaded with the cartons (29, 30) in a region of a pallet location,
  f) each of the three pallet locations (12, 13, 14) is associated with one of three loading conveyers (15, 16, 17) for loaded pallets (11), with each loading conveyer (15, 16, 17) immediately following the associated pallet location (12, 13, 14), respectively,
  g) the three loading conveyers (15, 16, 17) are positioned symmetrically to the pallet device (10) in such a manner that a middle one (16) of said three loading conveyers is positioned on both sides with equal spacing to the middle conveyer (16)
  h) empty pallets (28) are delivered to the pallet station by a plurality of return conveyers (27),
  i) one return conveyor (27) for empty pallets (28) is assigned to each loading conveyor (15, 16, 17) for fill pallets (11), and
  j) each of the return conveyers (27) is arranged under a respective loading conveyor (15, 16, 17).

6. The apparatus according to claim 5, wherein
  a) each conveyer (15, 16, 17) for full pallets (11) has a pallet position (12, 13, 14) adjacent to the pallet device (10) for loading a pallet (11),
  b) arranged at each pallet position (12, 13, 14) is a lift-and-drop platform (24, 25, 26) for receiving one loaded pallet (11) or empty pallet (28) at time, and
  c) the platform (24, 25, 26) is vertically movable so as to be capable of being dropped to the level of the return conveyer (27) for receiving an empty pallet (28) and lifted with the empty pallet (28) to the level of the associated conveyer (15, 16, 17) for loading.

* * * * *